INVENTORS
Toshio Tasaki and Teruo Ouchi
BY Kelman and Berman
Agents

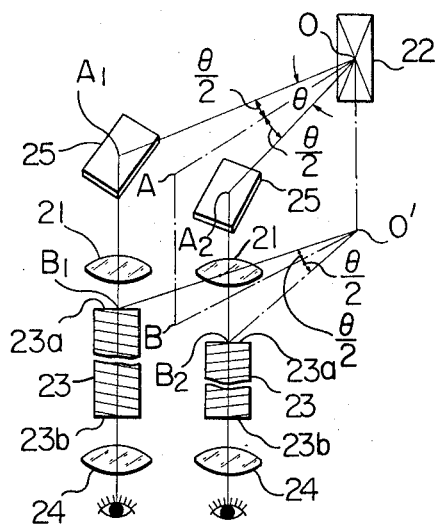
Fig. 5
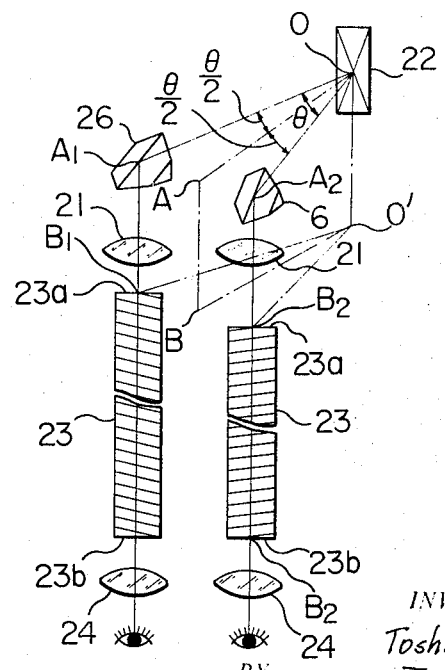
Fig. 6
Fig. 7
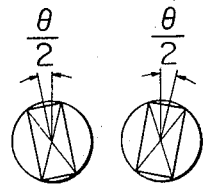
Fig. 8
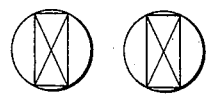

United States Patent Office 3,520,587
Patented July 14, 1970

3,520,587
STEREOSCOPIC ENDOSCOPE
Toshio Tasaki and Teruo Ouchi, Tokyo, Japan, assignors to Olympus Optical Co., Ltd., Tokyo, Japan
Filed Mar. 26, 1968, Ser. No. 716,178
Claims priority, application Japan, Mar. 29, 1967, 42/19,336
Int. Cl. G02b 21/20
U.S. Cl. 350—36          7 Claims

ABSTRACT OF THE DISCLOSURE

Stereoscopic endoscope having two elongated flexible fiber optical systems, an objective lens system being located in front of the forward end surface of each of said fiber optical systems for focusing an image of the object to be inspected thereon, an ocular being located behind the rear end surface of each of said fiber optical systems for viewing the image transmitted to the rear end surface thereof, the two light bundles incident to the respective objective lens systems from the object forming a parallax angle thereby creating a visual perception in three dimensions of the object when the images transmitted to the respective rear end surfaces of said two fiber optical systems are viewed simultaneously by an inspector through said oculars.

BACKGROUND OF THE INVENTION

The present invention relates to a front viewing stereoscopic endoscope, and more particularly to an endoscope which is provided with a pair of juxtaposed elongated flexible fiber optical systems each adapted to transmit an image formed on the forward end surface thereof to the rear end surface, a pair of objective lens systems each located in front of the forward end surface of each of the fiber optical systems at appropriate distance therefrom in alignment therewith so as to focus the image of the object to be inspected by the endoscope and located in front of the forward end portion of the endoscope on the forward end surface of each of the fiber optical systems by means of the objective lens systems and a pair of oculars each located behind the rear end surface of each of the fiber optical systems at appropriate distance therefrom in alignment therewith so that the image of the object transmitted to the rear end surface of each of the fiber optical systems from the forward end surface thereof through the fiber optical systems can be viewed by the inspector by means of the oculars, the objective lens systems being adapted to be directed to the object thereby making a parallax angle between the two light bundles incident to the respective objective lens systems from the object so that a visual perception in three dimensions of the object is obtained by the simultaneous viewing of the object at the parallax angle with both eyes of the inspector.

The present invention further relates to a side viewing stereoscopic endoscope, and more particularly to an endoscope which is provided with a pair of juxtaposed elongated flexible fiber optical systems each adapted to transmit an image formed on the forward end surface thereof to the rear end surface, a pair of objective lens systems each located in front of the forward end surface of each of the fiber optical systems in alignment therewith at an appropriate distance therefrom and having a reflecting optical element such as a plain mirror, Amici prism and the like secured to the forward end thereof so that the light from the object located at the side of the forward end portion of the endoscope at an angle such as a right angle to the axis thereof is received by each of the reflecting optical elements and is reflected thereby toward the objective lens systems so as to focus the image of the object on the forward end surface of each of the fiber optical systems and a pair of oculars each located at the rear side of the rear end surface of each of the fiber optical systems at appropriate distance therefrom in alignment therewith so that the image transmitted to the rear end surface of each of the fiber optical systems from the forward end surface thereof can be viewed by the inspector by means of the oculars, a parallax angle being formed between the two light bundles incident to the respective reflecting optical elements from the object so that a visual perception in three dimensions of the object is obtained by the simultaneous viewing of the object at the parallax angle with both eyes of the inspector.

An optical system is well known in which a flexible fiber optical system such as a transparent glass fiber bundle is utilized so as to transmit an image formed at one end surface of the fiber optical system therethrough to the opposite end surface thereof. However, the image thus obtained by the prior art optical system merely creates a visual perception in two dimensions so that exact inspection of the object is difficult.

Endoscopes of the prior art such as gastrofiberscopes and the like are provided with only a single objective lens system assembled with a fiber optical system thereby making it difficult to accurately inspect in detail an object having an uneven or bumpy surface so that, for example, early discovery of diseased portions of the living body is impossible by means of such an endoscope.

Therefore, an object of the present invention is to provide a novel and useful endoscope by which the above mentioned disadvantages of the endoscopes of the prior art are overcome.

Another object of the present invention is to provide a novel and useful stereoscopic endoscope by which an object located in front of the forward end of the endoscope at a parallax angle can be viewed with both eyes so as to create a visual perception in three dimensions of the object thereby permitting the object to be accurately inspected in detail, for example, for early discovery of diseased portions of the living body.

A further object of the present invention is to provide a novel and useful stereoscopic endoscope by which an object located at the side of the forward end of the endoscope at an angle to the axis thereof at a parallax angle can be viewed with both eyes so as to create a visual perception in three dimensions of the object thereby permitting the object to be accurately inspected, for example, for early discovery of diseased portions of the living body.

A still further object of the present invention is to provide a novel and useful optical system for use in the above mentioned front viewing stereoscopic endoscope.

Still another object of the present invention is to provide a novel and useful optical system for use in the above mentioned side viewing stereoscopic endoscope.

SUMMARY OF THE INVENTION

In accordance with one feature of the present invention, the endoscope is provided with a pair of juxtaposed flexible elongated fiber optical systems extending in the sheath of the endoscope and adapted to transmit the image formed on the forward end surface of each of the fiber optical systems therethrough to the rear end surface thereof, the forward end surfaces of said fiber optical systems being laterally spaced from each other at an appropriate distance and the rear end surface being also laterally spaced from each other at an appropriate distance, an objective lens system being located in front of each of the forward end surfaces of said pair of fiber optical systems at an appropriate distance therefrom in alignment therewith for focusing an image of the object to be inspected and located in front of the forward end portion of the endoscope on each of said forward end surfaces of said pair of fiber optical systems, and an ocular located behind each of the rear end surfaces of said pair of fiber optical systems at an appropriate distance therefrom in alignment therewith so as to permit the image transmitted to each of said rear end surfaces to be viewed through said oculars, each of the optical axes of said pair of objective lens systems in alignment with the forward end surface of the fiber optical system being directed to the object to be inspected by the endoscope so as to make a parallax angle between the two light bundles incident to the respective objective lens systems from the object thereby permitting disimilar images to be focused on respective forward end surfaces of said pair of fiber optical systems so that a visual perception in three dimensions of the object is created when the images transmitted to the respective rear end surfaces of said pair of fiber optical systems are viewed simultaneously by an inspector by means of said oculars.

Since an inverted image of the object is focused on the front end surface of each of said pair of fiber optical systems by the medium of the objective lens system, and consequently the inverted image is transmitted to the rear end surface of each of the fiber optical systems therethrough, each of the fiber optical systems is, in accordance with the present invention, twisted about its own optical axis at an angle of 180° so that the erect image of the object can be viewed by means of each of the oculars when it is desired to obtain the erect image of the object.

Alternatively, instead of twisting the fiber optical systems about their respective optical axes, Porro prisms adapted to convert an inverted image to an erect image can be provided between the rear end surface of each of the fiber optical systems and the associated ocular, so that erect images can be observed by means of oculars.

In an alternative embodiment of the present invention, when an erect image is not required, instead of twisting the fiber optical system about their respective axes at an angle of 180°, the pair of fiber optical systems are arranged to cross each other at their midpoints. In this case, however, the raised portions of the object are viewed as if they were recessed portions and vice versa. Therefore, it is convenient to utilize this alternative embodiment when the inspection is desired under the above mentioned condition.

Instead of directing the pair of objective lens systems toward the object so as to make a parallax angle between the optical axes of both the objective lens systems, a common auxiliary objective lens system of large size can be added to the optical system of the present invention at a location in front of each of the previously mentioned pair of objective lens systems thereby permitting the light passing through the auxiliary objective lens system to be made parallel so that said pair of objective lens systems can be arranged in parallel relationship to each other instead of being directed directly to the object so as to make a parallax angle. In this case, a parallax angle is formed between the two light bundles incident to the pair of objective lens systems before they pass through the auxiliary objective lens system.

In accordance with another feature of the present invention, the endoscope is provided with a pair of juxtaposed flexible elongated fiber optical systems extending in the sheath of the endoscope and adapted to transmit the image formed on the forward end surface of each of the fiber optical systems therethrough to the rear end surface thereof, the forward end surface of each of the fiber optical systems being laterally spaced an appropriate distance from each other and the rear end surface being also laterally spaced an appropriate distance from each other, an objective lens systems having a reflecting optical element such as a plain reflecting mirror, Amici prism and the like secured to the forward end thereof and located in front of each of the forward end surfaces of said pair of fiber optical systems at an appropriate distance therefrom in alignment therewith for focusing an image of the object to be inspected and located at the side of the forward end portion of the endoscope at an angle such as a right angle to the axis thereof on each of the forward end surfaces of said pair of fiber optical systems by the light incident to each of the reflecting optical elements from the object and reflected thereby toward each of the objective lens systems, and an ocular located behind each of the rear end surfaces of said pair of fiber optical systems at an appropriate distance therefrom in alignment therewith so as to permit the image transmitted to each of said rear end surfaces to be viewed thereby, the optical axes of said reflecting optical elements of said pair of objective lens systems extending at an angle to the respective axes of said objective lens systems being either fixedly or adjustably directed to the object to be inspected by the endoscope depending upon the distance between the object and the reflecting optical elements thereby making a parallax angle therebetween so as to permit dissimilar images of the object to be focused on the respective forward end surfaces of said fiber optical systems by virtue of the light from the object and incident to the respective forward end surfaces of said pair of fiber optical systems after the light is reflected by the reflecting optical elements and passes through the objective lens systems so that a visual perception in three dimensions of the object is created when the images transmitted to the respective rear end surfaces of said pair of fiber optical systems are viewed simultaneously by an inspector at the parallax angle by means of said oculars. When Amici prisms are provided in the optical system instead of plain reflecting mirrors, each of the images is reversed in a direction perpendicular to the plane containing therein the optical path from the object and that reflected by the Amici prism toward the objective lens system thereby avoiding the mirror symmetry of the image resulting from the provision of the plain reflecting mirror.

In case the parallax angle formed between the two light bundles incident to the pair of reflecting optical elements from the object is made adjustable depending upon the distance between the reflecting optical elements and the object by rotating the pair of reflecting optical elements about the optical axes of the objective lens systems to which they are secured, respectively, the adjustment of the focal plane of the objective lens systems depending upon the distance of the object can also be effected in connection with the adjustment of the parallax angle.

When the reflecting optical elements are incorporated in the optical system of the endoscope as described above so as to permit the object located at the side of the forward end portion of the endoscope at a right angle to the optical axis thereof to be viewed by the endoscope, since the images focused on the forward end surfaces of the pair of fiber optical systems are rotated symmetrically to each other by half the amount of the parallax angle about the optical axes of the objective lens systems, respectively, and consequently about the optical axes at the forward end surfaces of the fiber optical systems, respectively, with respect to the correct position of the object, the fiber optical systems of the present invention are symmetrically twisted about their own optical axes, respectively, so as to compensate for the above mentioned rotation of the images focused on the forward end surfaces of the fiber optical systems so that the images transmitted to the rear end surfaces thereof can be properly viewed by means of the oculars in order to create a visual perception in three dimensions of the image of the object. The degree of twist given to the fiber optical systems to compensate for the rotation of the images as described above will vary according to the degree of deflection from a right angle. Alternatively, the endoscope of the present invention may be provided with any suitable means for compensating for the above mentioned rotation of the images focused on the forward end surfaces of the fiber optical systems depending upon the amount of adjustment of the parallax angle in order to obtain correctly relocated images on the rear end surfaces of the fiber optical systems.

BRIEF DESCRIPTION OF THE DRAWINGS

FIG. 5 is a schematic perspective view showing the optical system of a side viewing endoscope constructed in accordance with the present invention, FIG. 6 is a view similar to FIG. 5 but showing a modification of the embodiment shown in FIG. 5, in which Amici prisms are provided in the optical system instead of planar reflecting mirrors as shown in FIG. 5, FIG. 7 is a view showing the rotation of the images about their centers, respectively, resulting from the provision of reflecting optical elements in the optical system of the side viewing stereoscopic endoscope, FIG. 8 is a view showing the images after compensation for the rotation thereof shown in FIG. 7 in accordance with the present invention.

DETAILED DESCRIPTION OF THE PREFERRED EMBODIMENTS

Figure 1:
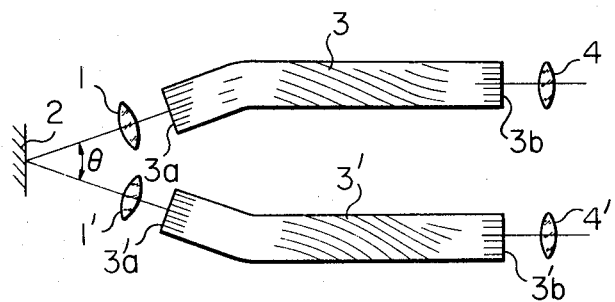
FIG. 1 is a schematic view illustrating a first embodiment of the optical system of the front viewing stereoscopic endoscope of the present invention.

Referring to FIG. 1, the optical system of the first embodiment of the endoscope of the present invention comprises a pair of objective lens systems 1, 1' each directed to object 2 to be inspected thereby forming a parallax angle $\theta$ between the two light bundles incident to respective objective lens systems 1, 1', a pair of juxtaposed elongated flexible fiber optical systems 3, 3', the forward end surfaces 3a, 3'a of said fiber optical systems 3, 3' being located rearward of said objective lens systems 1, 1' at an appropriate distance therefrom in alignment therewith, respectively, so as to focus the image of object 2 on each of said forward end surfaces 3a, 3'a, and a pair of oculars 4, 4' spaced rearward of rear end surfaces 3b, 3'b of fiber optical systems 3, 3' at an appropriate distance therefrom in alignment therewith, respectively, so that the images of object 2 transmitted to the rear end surfaces 3b, 3'b can be observed by oculars 4, 4'. Since the images of object 2 formed on forward end surfaces 3a, 3'a of fiber optical systems 3, 3' and transmitted to rear end surfaces 3b, 3'b are dissimilar from each other by virtue of parallax angle $\theta$, a visual perception in three dimensions of object 2 is obtained when the images on rear end surfaces 3b, 3'b are viewed simultaneously by the inspector by means of oculars 4, 4'. Since the images of object 2 focused on forward end surfaces 3a, 3'a by means of objective lens systems 1, 1' are inverted images, in accordance with the present invention, rear end surfaces 3b, 3'b are rotated about their own axes by the angle of 180° with respect to forward end surfaces 3a, 3'a, respectively, by twisting fiber optical systems 3, 3' about their own optical axes, respectively, when it is desired to obtain an erect image of the object.

Figure 2:
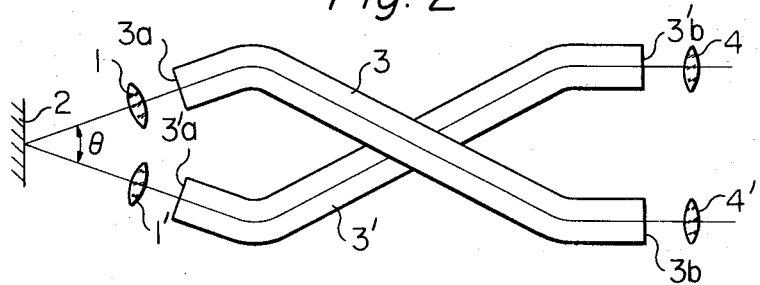
FIG. 2 is a view similar to FIG. 1 but showing an alternative embodiment.

When an erect image of the object is not required, in accordance with another feature of the present invention, fiber optical systems 3, 3' can be crossed as shown in FIG. 2 by having one of the pair of fiber optical systems 3, 3' traverse the other at the midpoint thereof. In this case, the raised portions of object 2 are observed as if they were recessed portions, because the images focused on forward end surfaces 3a, 3'a are reversed in the direction in which fiber optical systems 3, 3' traverse each other.

Figure 3:
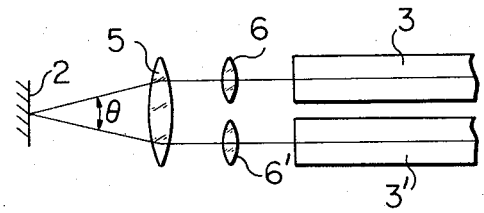
FIG. 3 is a fragmental view illustrating another modification of the embodiment shown in FIG. 1 or 2 in which a common auxiliary objective lens system is employed in the optical system.

Alternatively, a large common auxiliary objective lens system 5 is added to the optical system of the present invention as shown in FIG. 3. In this case, a pair of objective lens systems 6, 6' can be arranged in parallel, because the light from object 2 passing through auxiliary objective len system 5 is made parallel. Parallax angle $\theta$ is formed between the two light bundles incident to the pair of objective lens systems 6, 6' before they enter auxiliary objective lens system 5 as shown in FIG. 3, thereby permitting a visual perception in three dimensions of object 2 to be obtained by the optical system shown in FIG. 3.

Figure 4:
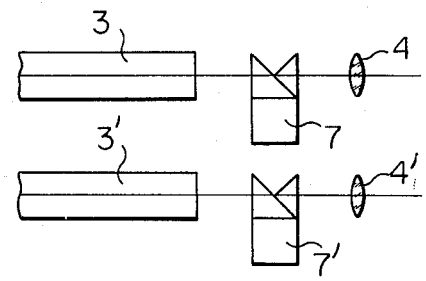
FIG. 4 is a fragmental view showing a further modification of the embodiment shown in FIG. 1 in which Porro prisms are provided at the rear end surface of each of the fiber optical systems for converting the inverted images transmitted to the rear end surfaces of the fiber optical systems to erect images.

Further, prisms such as Porro prisms 7, 7' which convert the inverted image to an erect image may be located between rear end surfaces of fiber optical systems 3, 3' and oculars 4, 4', respectively, as shown in FIG. 4 instead of twisting fiber optical systems 3, 3' in order to obtain an erect image of object 2.

In FIG. 5, the optical system of the second embodiment of the endoscope in accordance with the present invention comprises a pair of reflecting plain mirrors 25, 25, a pair of objective lens systems 21, 21, a pair of fiber optical systems 23, 23 and a pair of oculars 24, 24. The arrangement of these elements is as follows. Said reflecting plain mirrors 25, 25 are positioned so that the light from object 22 located at the side of the forward end of the endoscope at an angle to the axis thereof is received by each of said mirrors 25, 25 and is reflected toward each of objective lens systems 21, 21, a parallax angle $\theta$ being formed between the two light bundles from object 22 and received by respective objective lens systems 21, 21, each of forward end surfaces 23a, 23a of fiber optical systems 23, 23 being located rearward of each of objective lens systems 21, 21 at an appropriate distance therefrom in alignment therewith so that the image of object 22 is focused on each of forward end surfaces 23a, 23a of fiber optical systems 23, 23 by means of objective lens systems 21, 21, and the thus focused image is transmitted through each of fiber optical systems 23, 23 to each of rear end surfaces 23b, 23b, the image thus transmitted to each of rear end surfaces 23b, 23b being viewed simultaneously by the inspector with his both eyes by means of oculars 24, 24 thereby creating a visual perception in three dimensions of the object.

In this case, the images of object 22 are in mirror symmetry by virtue of the provision of plain reflecting mirrors 25.

Since the light from object 22, after being reflected by mirrors 25, 25, is focused by each of the pair of objective lens systems 21, 21 on each of forward end surfaces 23a, 23a of fiber optical systems 23, 23 lying in planes $OA_1B_1O'$ and $OA_2B_2O'$, respectively, which are positioned at the angle of $\theta/2$ with respect to neutral plane OABO' at the opposite sides thereof as shown in FIG. 5, the images focused on forward end surfaces 23a, 23a are rotated in the opposite directions about their centers, respectively, by the angle $\theta/2$ as shown in FIG. 7. In accordance with the present invention, fiber optical systems 23, 23 are twisted in the opposite directions about their own axes, respectively, by the angle $\theta/2$ in order to compensate for the rotation of the images thus focused on forward end surfaces 23a, 23a so that properly oriented images are obtained on rear end surfaces 23b, 23b of fiber optical systems 23, 23 as shown in FIG. 8.

FIG. 6 shows a modification of FIG. 5 wherein a pair of Amici prisms 26, 26 are employed as reflecting optical elements instead of plain mirrors 25, 25. In this case, the mirror symmetry effect resulting from the provision of plain mirrors 25, 25 of image of object 22 viewed through oculars 24, 24 is compensated for.

Of course, it is possible in the embodiment of FIG. 5 to avoid the mirror symmetry effect by providing a further reflecting optical element at a position adjacent each of oculars 24, 24 which reverses the image in either the vertical or horizontal direction.

The angle between the light bundle from the object and that reflected by the reflecting optical system is not limited to a right angle. However, if the deflection angle is selected to be an angle other than a right angle, the angle of twisting fiber optical systems 23, 23 must be varied from the angle of $\theta/2$ according to the deflection angle, because the angle of rotation of the image focused on each of forward end surfaces 23a, 23a varies depending upon the deflection angle.

Figure 9:
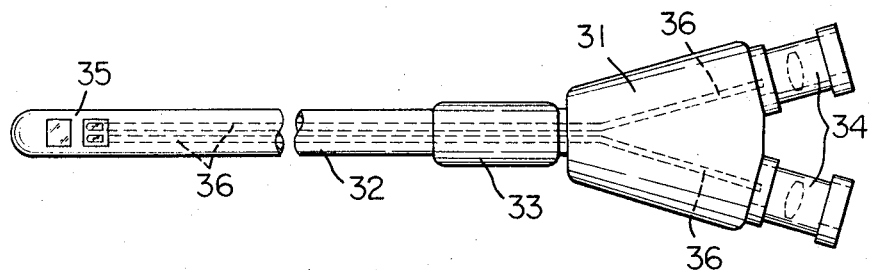
FIG. 9 is a general view of a side viewing stereoscopic endoscope constructed in accordance with the present invention.
Figure 10:
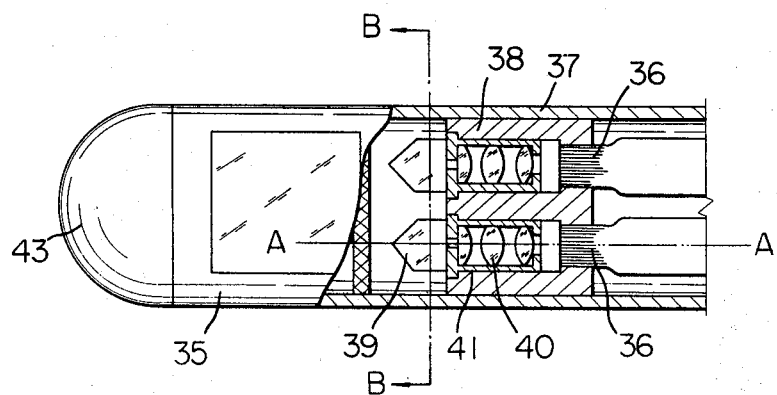
FIG. 10 is a fragmentary view partly in cross-section illustrating the arrangement of the elements located in the forward end portion of the embodiment of FIG. 9.
Figure 11A:
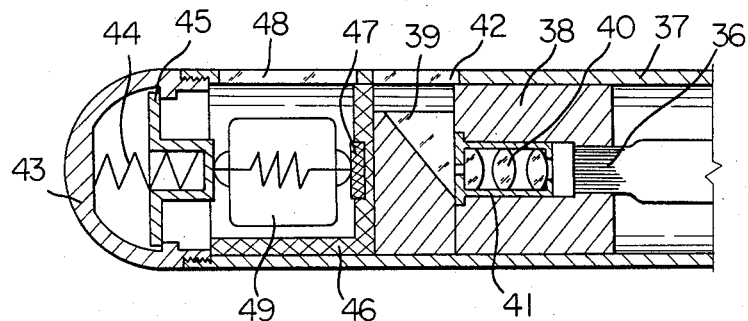
FIG. 11A is a fragmentary longitudinal cross-sectional view taken along line A—A in FIG. 10 and illustrating the various elements provided in the forward end portion of the embodiment of FIG. 9.
Figure 12:
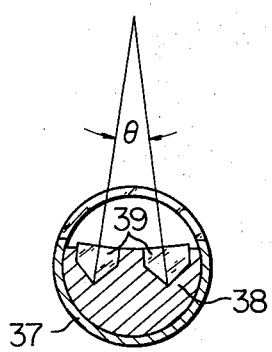
FIG. 12 is a cross-sectional view taken along line B—B in FIG. 10.

In FIG. 9, the embodiment of the side viewing stereoscopic endoscope constructed in accordance with the present invention comprises a control housing 31, an elongated flexible sheath 32 rotatably joined at its proximal end to said control housing 31 by the interposition of grip 33, a forward end portion 35 connected to the distal end of sheath 32 and threadedly mounting thereon a cap 43, and a pair of oculars 34, 34 secured to said control housing 31, a pair of juxtaposed elongated flexible fiber optical systems 36, 36 extending through said sheath 32, grip 33 and control housing 31 with the forward end surfaces thereof terminating at positions adjacent to said forward end portion 35 and the rear end surfaces thereof terminating at position adjacent to said oculars 34, 34 at appropriate distances therefrom in alignment therewith, respectively. Oculars 34, 34 can be adjusted to suit the focal length of the eyes of the inspector as well as the distance between the eyes of the inspector. Movable contact 45 biased by means of spring 44 is provided in cap 43 as shown in FIG. 11A. Forward end portion 35 comprises cylindrical member 37 connected to the distal end of sheath 32. Insulator 46 is fixedly secured in the forward end of cylindrical member 37, and stationary contact 47 is secured to insulator 46 in opposing relation to said movable contact 45. Contact 45 is grounded to the body of the endoscope through cylindrical member 37 while contact 47 is connected to a terminal of an electric source not shown through a lead wire and switch means not shown, the other terminal of the electric source being grounded to the body of the endoscope. Lamp 49 is detachably held between contacts 45 and 47 so as to be energized thereby. The light from lamp 49 passes through window glass 48 provided in an opening of cylindrical member 37 so that the object to be inspected by the endoscope is illuminated. Lens holding piece 38 is secured in cylindrical member 37 and a pair of objective lens systems 40, 40 arranged in lens barrels 41, 41 are mounted in lens holding piece 38 in juxtaposed relation to each other. A prism such as Amici prism 39 is secured to the front end of each of lens barrels 41, 41. The light from the object passes through window glass 42 provided in the opening of cylindrical member 37 and is received by each of said prisms 39 so that the light is reflected toward each of objective lens systems 40, 40. In accordance with the present invention, each of said prisms 39 is directed to the object as shown in FIG. 12 so that a parallax angle $\theta$ is formed between the two light bundles incident to respective prisms 39, 39 from the object. The forward end surface of each of said fiber optical systems 36, 36 is located rearward of each of said objective lens systems 40, 40 at an appropriate distance therefrom in alignment therewith so that the image of the object is focused on the forward end surface of each of said fiber optical systems. The image focused on each of the forward end surfaces of fiber optical systems 36, 36 is transmitted therethrough to the rear end surface thereof thereby permitting the images of the object to be viewed simultaneously by the inspector by means of oculars 34, 34. Since dissimilar images are focused on the respective forward end surfaces of fiber optical systems 36, 36 by virtue of the parallax angle $\theta$ and transmitted to the rear end surfaces of fiber optical systems 36, 36, a visual perception in three dimensions of the object is obtained by the simultaneous viewing of the dissimilar images of the object transmitted to the rear end surfaces of fiber optical systems 36, 36. As described previously, fiber optical systems 36, 36 are twisted in the opposite directions about their axes, respectively, so as to compensate for the rotation of the images focused on the forward end surfaces of fiber optical systems 36, 36.

Figure 11B:
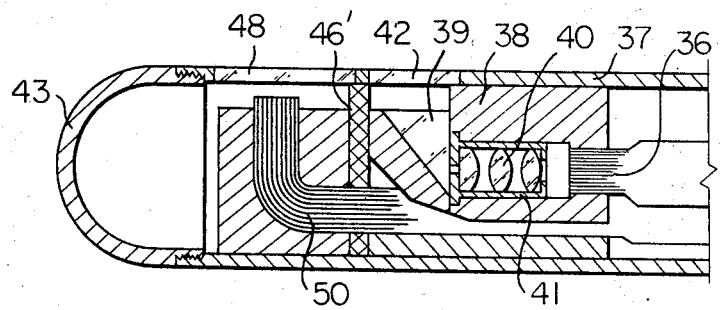
FIGS. 11B and 11C shows the modifications of the illuminating system of the embodiment shown in FIGS. 10 and 11A.
Figure 11C:
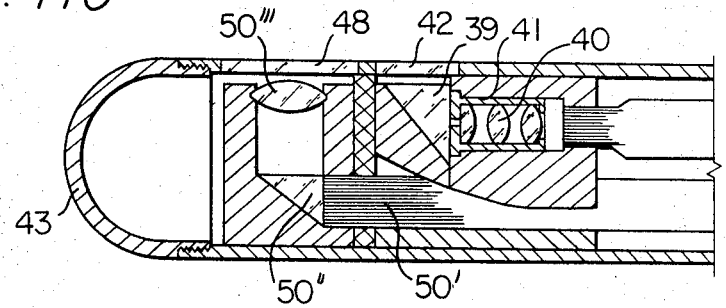

FIGS. 11B and 11C show two modifications of the illuminating system of the endoscope of the present invention. In FIG. 11B, light conducting fiber optical system 50 is provided instead of lamp 49. The forward end of light conducting fiber optical system 50 is directed to window glass 48 as shown and light conducting fiber optical system 50 extends through sheath 32 toward control housing 31 and is branched at appropriate position from sheath 32, grip 33 or control housing 31 so that an external light source not shown can supply the illuminating light to the branched end of light conducting fiber optical system 50. The light transmitted to the distal end of light conducting fiber optical system 50 passes through window glass 48 and illuminates the object to be inspected. In FIG. 11C, condenser lens 50''' and prism 50'' are provided so as to reflect the light from straight light conducting fiber optical system 50' toward window glass 48 and condense or focus the light on the object to be inspected.

Figure 13:
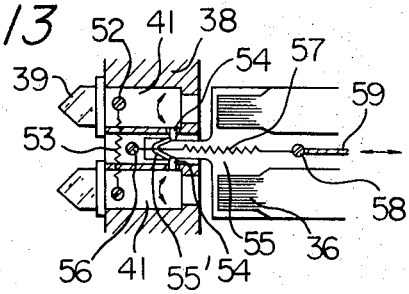
FIG. 13 is a fragmentary view illustrating a portion of another side viewing stereoscopic endoscope constructed in accordance with the present invention, in which the parallax angle can be manually adjusted depending upon the distance between the reflecting optical elements and the object.
Figure 14:
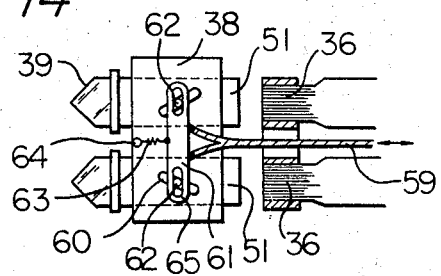
FIG. 14 is a view similar to FIG. 13 but showing an alternative embodiment of FIG. 13.

FIGS. 13 and 14 show two modifications of the embodiments shown in FIGS. 9 to 12, in which the parallax angle and the focusing of the objective lens systems are manually adjustable depending upon the distance between the reflecting optical elements and the object to be inspected by the endoscope.

In FIG. 13, lens barrels 41, 41 holding objective lens systems therein are rotatably mounted in lens holding piece 38, respectively, but their axial movement is prevented. When lens barrels 41 are rotated about their axes by the same angle in opposite directions, the reflecting optical elements such as Amici prisms 39 secured to the forward ends of lens barrels 41, respectively, can be directed to the object to be inspected by the endoscope and lying at various distances from the reflecting optical elements thereby resulting in various values of parallax angle $\theta$. Adjustment of the focusing is effected by axially shifting the forward end surfaces of fiber optical systems 36 depending upon the distance between the reflecting optical elements and the object. To this end, one end of tension spring 53 is secured to pin 52 fixed on one of lens barrels 41 while the other end of spring 53 is secured to a pin fixed to the other of lens barrels 41 so that lens barrels 41 are biased to rotate in opposite directions. Adjusting member 55 in which the forward end portions of the pair of fiber optical systems 36 are mounted is axially movable so that the distance between the objective lens systems 21, 21 and the forward end surfaces of fiber optical systems 36 can be adjusted in accordance with the distance between the object and the reflecting optical elements. Member 55 is normally urged toward the forward end of the endoscope by means of tension spring 57 which is secured at its one end to pin 56 fixed to a stationary portion in the forward end of the endoscope and at its other end to pin 58 mounted on member 55. Pin 58 also supports one end of tension string 59 which extends through the sheath of the endoscope to the control housing not shown so that string 59 is manually controlled from the housing thereby shifting member 55 axially in cooperation with string 57 so as to permit the forward end surfaces of fiber optical systems 36 to be located in the focal planes of the objective lens systems determined by the distance between the reflecting optical elements and the object. Suitably shaped cam 55' is formed on the forward end portion of member 55 and engages with pin 54 secured to each of lens barrels 41 as shown, thereby permitting lens barrels 41 to be rotated in opposite directions to each other in cooperation with tension spring 53 so as to permit reflecting optical elements 39 to be directed to the object. Thus, the focusing of the objective lens systems as well as the rotation of the reflecting optical elements can be controlled properly by manually operating string 59 in the embodiment shown in FIG. 13. Suitable means can be incorporated in the endoscope so as to adjust the amount of twisting of fiber optical systems 36 in order to correctly compensate for the rotation of the images focused on the forward end surfaces of fiber optical systems 36 depending upon the distance between the reflecting optical elements and the object.

In FIG. 14 showing a modification of FIG. 13, the forward end surfaces of fiber optical systems 36 are held stationary, but the objective lens systems are both axially movably and rotatably mounted in lens holding piece 38 in contrast to the embodiment of FIGS. 13. Adjusting member 61 is movably mounted on lens holding piece 38 and is normally urged toward the forward end of the endoscope by means of spring 63 one end of which is secured to lens holding piece 38 as shown. Like the embodiment in FIG. 13, tension string 59 is secured at its one end to member 61 so that the position of member 61 with respect to lens holding piece 38 is adjusted by the manual control of the string from the control housing not shown. Pin 62 secured to each of lens barrels 51 engages with either of a pair of elongated slots 60 formed in lens holding piece 38 which are obliquely inclined symmetrically with respect to the optical axes of the objective lens systems held in lens barrels 51 as well as with either of a pair of elongated slots 65 formed in member 61, the longitudinal directions of said slots 65 being transverse to the optical axes of the objective lens system and in alignment with each other as shown. In an endoscope with the construction described above, when string 59 is manually operated from the control housing so as to adjustably shift member 61 axially, lens barrels 51 to which reflecting optical elements 39 are secured, respectively, can be rotated about their axes in opposite directions to each other and axially shifted by virtue of above mentioned pin-slot engagement 60, 62, 65, so that adjustment of focusing as well as the parallax angle can be effected appropriately.

The present invention is not to be considered to be limited to the embodiments described above but it is to be understood that the present invention includes the broad concept of the present invention as set forth

We claim:
1. A stereoscopic endoscope comprising in combination:
(a) a central housing;
(b) an elongated flexible sheath having a rear end portion secured to said housing and a forward end portion remote from said housing;
(c) two elongated flexible systems of light transmitting fibers, each system extending in said sheath from said housing to said forward end portion and having a forward end surface and a rear end surface, each system being adapted to transmit an image from said front end surface to said rear end surface thereof;
(d) image froming means for receiving two light beams from the same object when said beams diverge from said object at an oblique parallax angle, and for focusing said beams on said forward end surfaces respectively for forming respective images of said object on said forward end surfaces,
  (1) said image forming means including two optical objective systems forwardly spaced from said forward end surfaces respectively and having respective optical axes converging toward said object at said angle; and
(e) two ocular means mounted on said housing and rearwardly spaced from said rear end faces respectively and spaced from each other for simultaneous viewing of the two images of said object transmitted to said rear end surfaces by the two eyes of a viewer.

2. An endoscope as set forth in claim 1, wherein said flexible systems have respective longitudinal axes, the fibers in each system being twisted 180° about the axis of the system.

3. An endoscope as set forth in claim 1, wherein said flexible systems have respective longitudinal axes, respective portions of said flexible systems axially spaced from said forward and rear end surfaces traversing each other.

4. An endoscope as set forth in claim 1, further comprising a Porro prism operatively interposed between each of said rear end surfaces and the associated ocular means.

5. An endoscope as set forth in claim 1, wherein said image forming means further include two light reflecting means forwardly spaced from said objective lens systems respectively for angularly reflecting said beams toward said objective lens systems, each of said reflecting means being mounted on said sheath for rotation about the optical axis of the associated objective lens system, and rotating means for simultaneously rotating said reflecting means in opposite respective directions about said axes.

6. An endoscope as set forth in claim 5, wherein said rotating means include an elongated tension member extending in said sheath from said forward end portion to said housing, and longitudinally movable in said sheath, and motion transmitting means connecting said tension member to said reflecting means for rotating said reflecting means in response to longitudinal movement of said tension member.

7. An endoscope as set forth in claim 6, further comprising means for varying the spacing of each objective lens system from the associated forward end surface in response to said longitudinal movement of said tension member, and a spring opposing said movement of the tension member.

References Cited
UNITED STATES PATENTS

| | | | |
|---|---|---|---|
| 2,975,785 | 3/1961 | Sheldon | 350—96 X |
| 3,011,403 | 12/1961 | Dlutzik | 350—54 XR |
| 3,020,806 | 2/1962 | Castrucci | 350—96 X |
| 3,028,791 | 4/1962 | Clark et al. | 350—47 X |
| 3,068,772 | 12/1962 | MacNeille | 350—96 |
| 3,090,378 | 5/1963 | Sheldon et al. | 350—96 X |
| 3,143,589 | 8/1964 | Brault et al. | 350—96 |
| 3,414,344 | 12/1968 | Mukojima | 350—54 XR |

PAUL R. GILLIAM, Primary Examiner

U.S. Cl. X.R.

350—96, 130